United States Patent [19]

Lunazzi

[11] Patent Number: 4,590,661
[45] Date of Patent: May 27, 1986

[54] HOBBING MACHINE TOOL CHANGER HAVING VERTICALLY AND HORIZONTALLY MOVABLE JAWS

[75] Inventor: Alessandro Lunazzi, Bologna, Italy

[73] Assignee: CIMA S.p.A., Villanova di Castenaso, Italy

[21] Appl. No.: 633,044

[22] Filed: Jul. 20, 1984

[30] Foreign Application Priority Data

Nov. 3, 1983 [IT] Italy ................. 3607 A/83

[51] Int. Cl.$^4$ ............................. B23Q 3/157
[52] U.S. Cl. ....................... 29/568; 409/11; 414/753
[58] Field of Search ........... 29/568; 409/11, 12; 414/223, 226, 753

[56] References Cited

U.S. PATENT DOCUMENTS

| 4,287,659 | 9/1981 | Erhardt et al. ............... 29/568 |
| 4,457,659 | 7/1984 | Watanabe ...................... 414/223 |

FOREIGN PATENT DOCUMENTS

| 1096719 | 8/1958 | Fed. Rep. of Germany ........ 409/11 |
| 2919873 | 11/1980 | Fed. Rep. of Germany . |
| 48407 | 7/1984 | Fed. Rep. of Germany ........ 409/11 |
| 55-112753 | 8/1980 | Japan ........................... 29/568 |
| 2025275 | 1/1980 | United Kingdom . |
| 2061786 | 5/1981 | United Kingdom ........... 409/11 |

*Primary Examiner*—Fred Silverberg
*Attorney, Agent, or Firm*—Balogh, Osann, Kramer, Dvorak, Genova & Traub

[57] ABSTRACT

Equipment and method for automatically changing tools on hobbing machines. The machines are of the type equipped with a bedplate to which are connected a pair of uprights, the first of which for supporting a work head and the second of which for supporting a cutter head. The cutter head is rotatable around a horizontal axis and supports horizontally a hob at the extremities thereof. The equipment includes guide means provided in the cutter head, parallel to the axis of the hob, and a support for at least one extremity of the hob is slidable inside the cutter head along the guide means. The support is also displaceable, without being withdrawn from the cutter head, by an amount sufficient to free the two extremities of the hob from the cutter head. The equipment includes also an independent frame fixable to either one of the pair of uprights, and supporting grasping means located above the cutter head. A tool storage space which is also supported by this frame is constituted by a head formed of a number of pairs of arms between which the extremities of the hob could be engaged.

4 Claims, 19 Drawing Figures

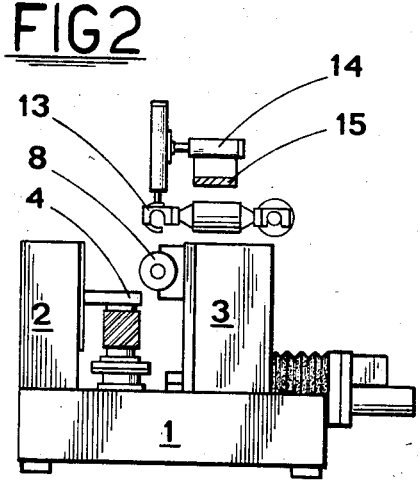
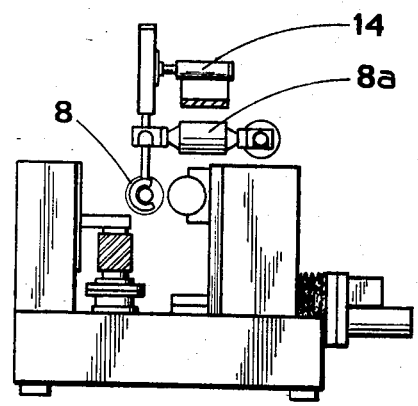
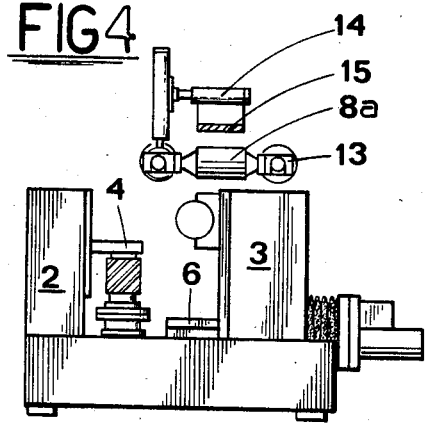
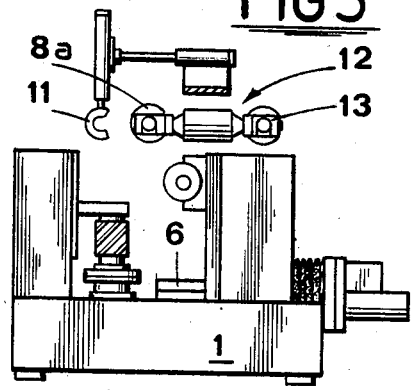
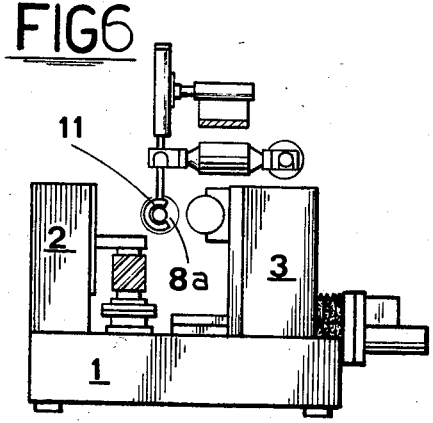
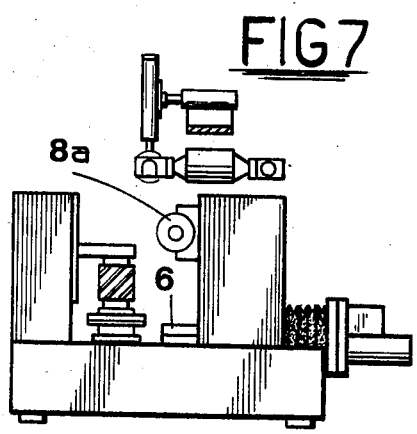

HOBBING MACHINE TOOL CHANGER HAVING VERTICALLY AND HORIZONTALLY MOVABLE JAWS

BACKGROUND OF THE INVENTION

The invention relates to a method and equipment for automatically changing tools on hobbing machines.

DESCRIPTION OF THE PRIOR ART

Gear cutting machines that are equipped with two identical grasping devices are known in the art as per United Kingdom Patent No. 2,025,275. These machines have the grasping devices placed, one at the side of the other, above the working area (the area in which the hob operates) of the machine, and along the same axis of support that extends parallel to the axis of the hob.

The grasping devices can be carried, one at a time, into a position where they are aligned, in a vertical plane, with the cutter head of the machine. Furthermore, these devices can be rotated, one at a time, around a corresponding axis of support until reaching a position for grasping the hob supported by the cutter head, the position being one in which the relevant grasping means are coaxial with the axis of the hob.

One of the devices (that can be defined the first device) is charged with a hob suitable to replace that in operation on the machine, while the other (that can be defined the second device) is kept uncharged so as to be able to withdraw, at the time of replacement thereof, the hob in operation.

Another known solution is described in German Pat. No. 2,919,873. According to this disclosure, the gear cutting machine is equipped with a grasping device supported overhead of and in alignment with the cutter head, and able to rotate around a corresponding axis of support parallel to the axis of the hob in operation on the machine.

This grasping device can reach, through rotation, two stable positions, that is to say, a first position for grasping the hob carried by the cutter head (or also for positioning a hob between the supports with which the head is provided), and a second position in which the device is located way past the tool storage space, after having deposited there the hob. The storage space is essentially constituted by a head able to rotate around a horizontal axis perpendicular to the axis of rotation of the grasping device. This head includes a number of pairs of arms, parallel in twos, each pair of which forming means for supporting and locking a hob with the axis thereof parallel to the axis of rotation of the grasping device.

The tool storage space is located at a certain height above the grasping device. The step rotation of the storage space head, in time with the movements of rotation and the pauses of the grasping device, enables each pair of arms of the head to be carried into the region of the grasping device.

With the technical solutions described above, a considerable amount of space is occupied immediately above and at the side of the working area. Furthermore, the operation of recovering and replacing the hob withdrawn from the cutter head is particularly difficult.

Also, in every one of the cases outlined above, in order to allow the rotation of the hob grasping devices it is necessary, at the time the tool is being replaced, to subject the displacements both the upright that supports the cutter head and the upright that supports part of the work head.

SUMMARY OF THE INVENTION

The technical task forming the basis of the invention is, therefore, to overcome the aforementioned difficulties through a new method and new equipment for automatically changing on hobbing machines, tools to be overhauled.

Within the framework of this technical task one important object of the invention is to make available a method and equipment, thanks to which the automatic substitution of hobs can be effected in a fast and simple way. The present invention provides in particular for the displacement of the uprights of the machine to be reduced to the limited displacement of one single upright (namely that supporting the cutter head), and for the means that drive the machine to be utilized for the required displacement movements so as to, eliminate the need for supplementary special powering devices for the hob replacement operations.

Another important object of the invention is to make available equipment independent of the machine to which it is destined to be fitted and thus having universal employment possibilities.

A further, though not final, object is to make available equipment provided with tool storage space of a notable capacity that can be placed outside the working area of the hob, in particular above the upright that supports the cutter head, with the possibility of access at the sides or from the rear of the machine.

The objects stated above are attained with the method according to the invention for automatically changing tools on hobbing machines, consisting in gripping the hob bilaterally through grasping means able to be inserted between the supports of the extremities of the hob; in disengaging the hob from both extremities of support of the cutter head, keeping the hob motionless and by displacing axially thereto at least one of the supports, carrying the hob first in a vertical plane external and parallel to the frontal vertical plane of the cutter head and then, carrying it through a vertical rectilineal movement, up to tool storage space that extends in a horizontal plane overhead of both the cutter head and the upright that supports the head; in rotating, maintaining one and the same plane, the storage space in such a way as to vary the part thereof overhead of the cutter head; in gripping a new hob in the storage space so as to transfer this hob with an identical vertical displacement movement, into the region of the cutter head; and in locking the extremities of the new hob to the supports by displacing these in the opposite direction to that in which they were moved previously.

Advantageously provided is equipment for automatically changing tools on hobbing machines that includes a support for one extremity of the hob, able to slide inside the cutter head along guides that are virtually parallel to the axis of the hob and can be displaced, without being withdrawn, by an amount sufficient to free the two extremities of the hob from the cutter head.

The equipment also includes gripping means placed above and in alignment with the cutter head, movable along a vertical plane and able to be displaced from the horizional plane of the cutter head to the horizontal plane overhead including the tool storage space. The head constituting the tool storage space can be rotated around a vertical axis and is situated, on an independent support, above the upright that supports the cutter head without, therefore, encumbering the working area of the hob.

BRIEF DESCRIPTION OF THE DRAWINGS

The characteristics and advantages of the invention will become more apparent from the description that follows of two preferred, though not sole, embodiments for the invention, illustrated purely as unlimited examples on the accompanying drawings, in which:

FIGS. 2 to 7 show the various phases in the method according to the invention, as carried out by the machine in FIG. 1, shown diagrammatically in a lateral view;

DESCRIPTION OF THE PREFERRED EMBODIMENTS

Figure 1:
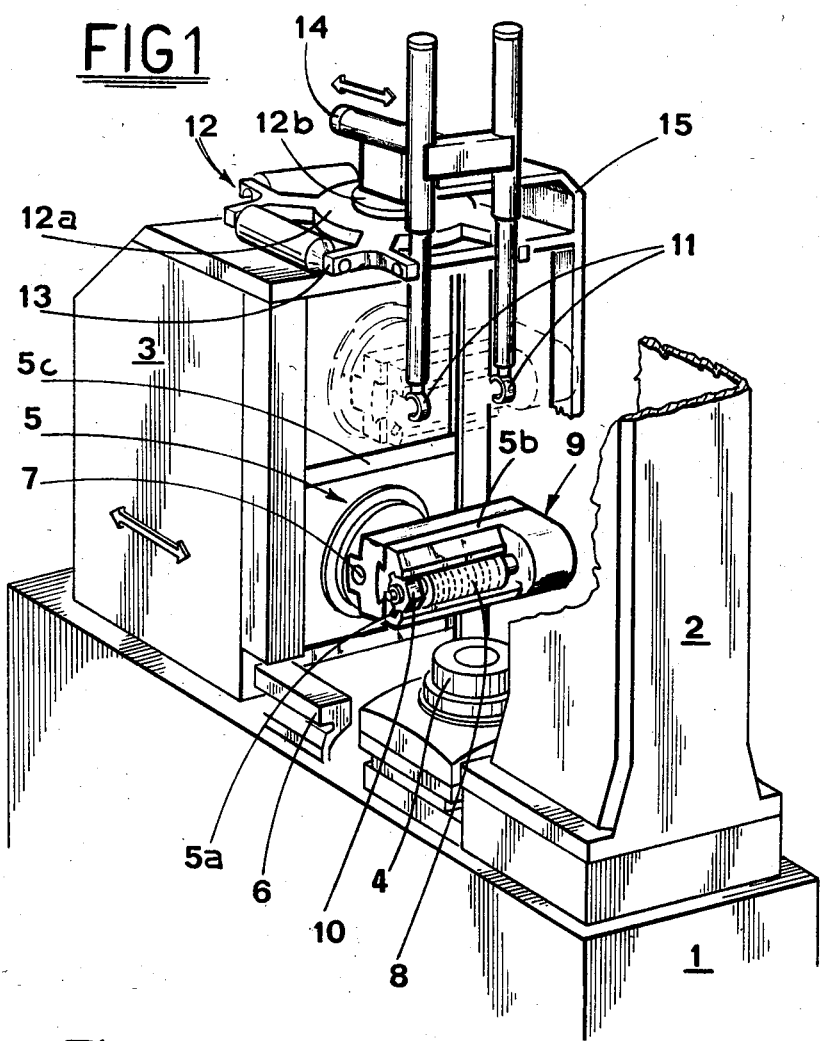
FIG. 1 shows diagrammatically and in an overall perspective view, a hobbing machine provided with equipment according to the invention, in a first embodiment.
Figure 8:
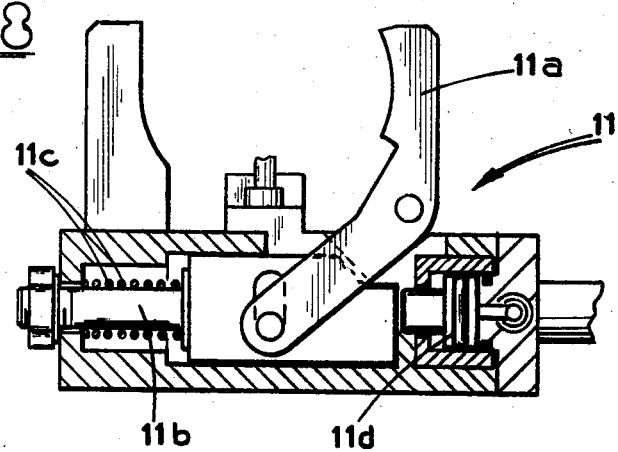
FIG. 8 shows, one way in which the elements for grasping the hob and for transferring it from the cutter head to the tool storage space, are constructed.
Figure 9:
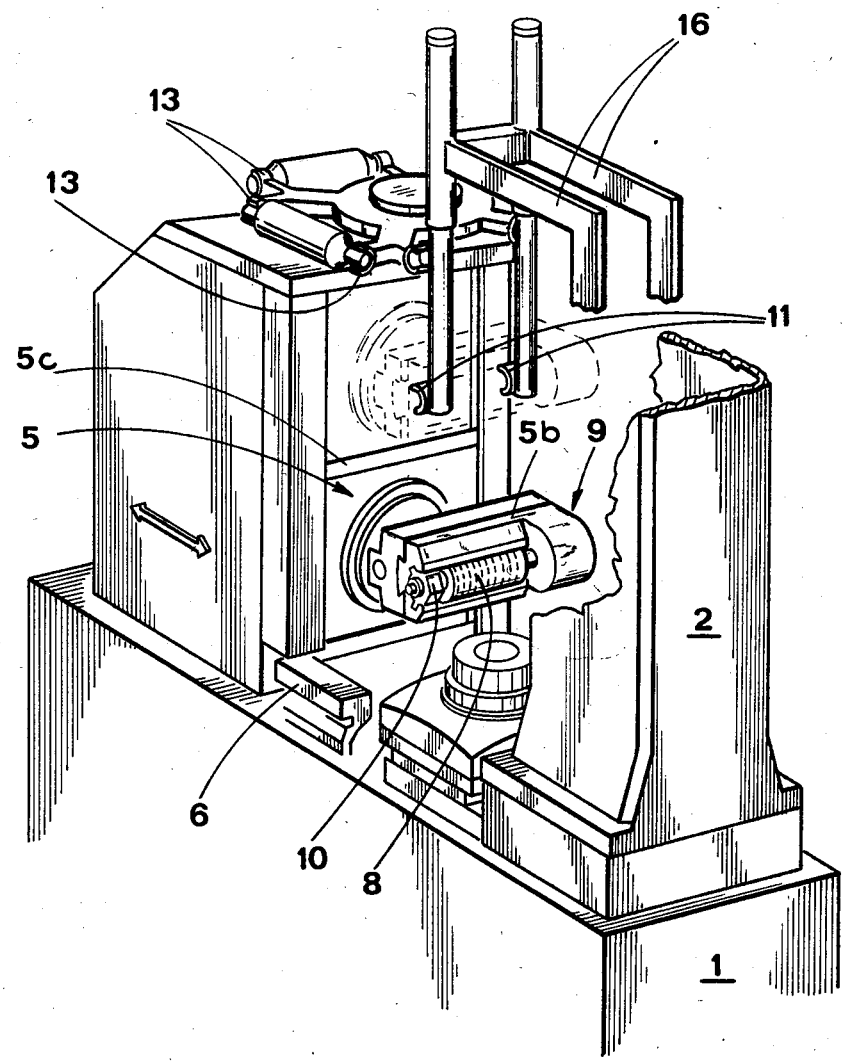
FIG. 9 shows, diagrammatically and in an overall perspective view, a hobbing machine provided with equipment according to the invention, in a second embodiment.
Figure 10:
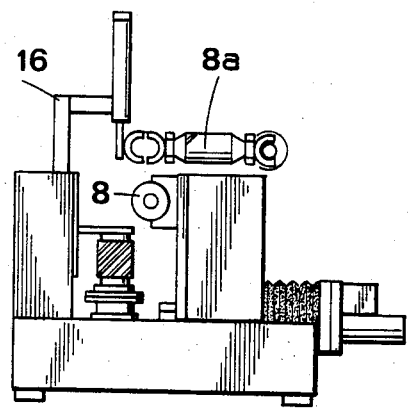
FIGS. 10 to 19 show the various phases in the method according to the invention, as carried out by the machine in FIG. 9.
Figure 11:
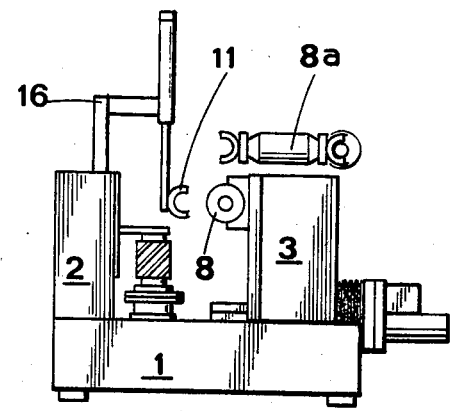
Figure 12:
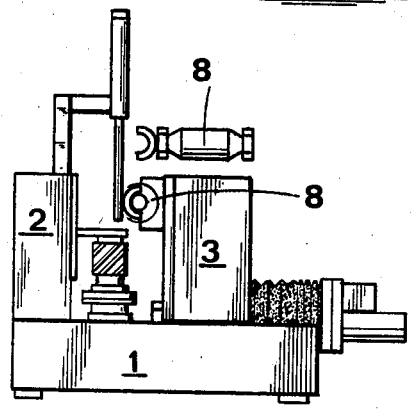
Figure 13:
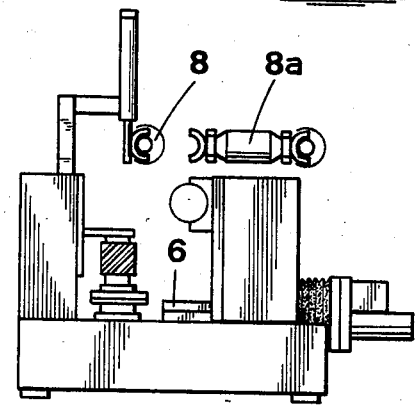

With reference to FIGS. 1 to 8, the equipment and method according to the invention are jointly described in the text that follows. Shown in particular in FIG. 1 is a machine of a type in itself known that includes a bed-plate 1 to which are connected two uprights 2 and 3, the first of which for supporting a work head 4 and the second of which for supporting a cutter head 5.

In accordance with the known practice, the upright 3 is able to slide (in the two directions) in guides 6 (affixed to bedplate 1) in the direction of the upright 2; the support 5c of the cutter head 5 can traverse (in the two directions) vertically and the cutter head 5 can rotate (again in the two directions) around a horizontal axis parallel to the guides 6. Furthermore, the part 5b of the cutter head 5 is able to slide (in the two directions) along a guide 7 in the cutter head at the time a hob 8 is operating, so as to achieve what is called the "shifting movement" of the hob 8 with respect to the piece being machined (not shown on the drawings) that is supported by the work head 4.

Since, as stated above, the hobbing machine is of a type known to technicians in the industry concerned, no further description will be given of the component parts thereof. It can just be said that the hob 8 is supported, on one side, by a drive head 9 connected to the cutter head 5, and on the other, (on the left in FIG. 1) by a support 10 that can be locked mechanically or hydraulically to the cutter head 5. On the machine according to the invention, the support 10 is able to slide axially with respect to the cutter head 5, along guides 5a parallel to the guide 7.

The movement of the support 10 inside and towards the outside of the cutter head 5 makes it possible to disengage the hob 8 from the drive head 9 and from the support 10, leaving the hob 8 positioned, in phase, on resting means provided on the cutter head 5, from which the hob is withdrawn by the grasping elements 11.

Both the support 10 and the drive head 9 can be provided internally with gripper devices of a known type that rapidly lock the extremities of the hob 8 and are operated, for example, by means of hydraulically or pneumatically controlled pistons connected thereto.

The grasping elements 11 are movable in a vertical plane parallel to the frontal plane of the cutter head 5, and are structurally able to grip the hob 8 in the region of the collars (of the hob) in the immediate vicinity of the part provided with cutting edges.

These grasping elements (see FIG. 8) can be of a gripper type, with the movable jaw 11a articulated to the rob 11b of a piston which is acted on forcefully by a spring 11c for closing the grasping elements.

Acting on the first piston is a second piston 11d, the chamber of which can be connected to a hydraulic or pneumatic circuit in order to open the grasping elements. The opening operation can, any way, be effected by extracting with force the piece gripped in between the jaws, overcoming the counteraction of the spring 11c.

The grasping elements 11 are able to traverse vertically in the direction of tool storage space 12 placed above the machine and supported by a frame 15 independent on the upright 3. In the case described herein, the grasping elements 11 are connected to corresponding pistons held in a vertical position and linked to a pusher member 14 able to displace the said pistons, and therefore the grasping elements 11, in a direction perpendicular to the frontal plane of the cutter head 5. The pusher member 14 is sustained by the same frame 15 that supports the storage space 12.

As shown in FIGS. 1 to 7, the tool storage space 12 includes a head 12a able to rotate around a vertical support 12b. The head 12a is provided with a number of arms 13 designed to sustain and lock the extremities of the hobs 8. The arms are equipped with cradle shape grippers (that can be, for example, of the same type as those depicted in FIG. 8), suitable to hold stably in a vise the bilateral extremities of a hob the moment it reaches (through the movable grasping elements 11) the storage space 12.

A complete cycle for replacing a hob in accordance with the method and equipment forming the subject of the invention will now be briefly described.

In the commencement phase, the cutter head 5 is carried into the zeroing (horizontal) position and moved away from the work piece undergoing machining, after which it is carried into the high position as close as possible to the grasping elements 11 (FIG. 2).

To achieve an arrangement, in the phase, whereby the grasping elements 11 face the cutter head 5, the upright 3 can be displaced backwards using the drive to which it is normally connected, or else the pusher member 14 can be operated.

Subsequently, the grasping elements 11 are carried into the position in which the hob 8 is held in a vise; then, with the extremities of the hob freed from the fast locking means inside the drive head 9 and from the support 10, the latter is moved towards the outside of the cutter head 5 by an amount (as stated earlier on), such as to enable the hob 8 to be freed completely.

At this stage, by displacing the upright 3 or operating the pusher member 14, the hob 8 is placed in a condition in which it can be transferred to the storage space (FIGS. 3 and 4) with the grasping elements 11 moving vertically upwards until the hob 8 is held in the grip of two arms 13. When this position is reached, the pusher member 14 carries the grasping elements 11 into a position external to the storage space 12; then the storage space 12 undergoes an angular rotation such as to carry a new hob 8a into the region of the work plane of the grasping elements 11. The new hob can then be gripped by the grasping elements 11 returned by the pusher member 14 to the forward position, and be moved into the region of the cutter head 5.

At this juncture, in order to have, upon completion of the operating cycle, the new hob 8a stably secured to the cutter head 5, the same movements described previously for disengaging the hob 8 have to be effected in reverse.

In accordance with what is shown in FIGS. 9 to 19, a frame 16, fixable above the upright 2, holds in a vertical position the pistons to which the grasping elements 11 are connected.

Once a grip on the hob 8 has been effected by the grasping elements 11, the upright 3 is displaced backwards, so as to allow the transfer of the hob 8 to the storage space 12 (FIGS. 10 to 13) with the grasping elements 11 moving vertically upwards.

Figure 14:
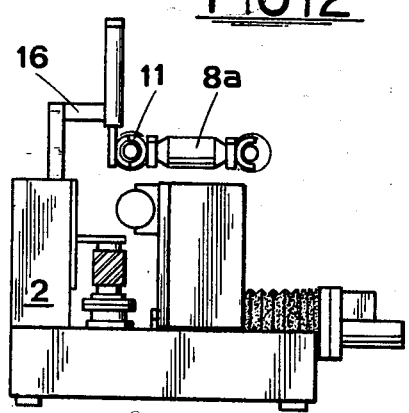
Figure 15:
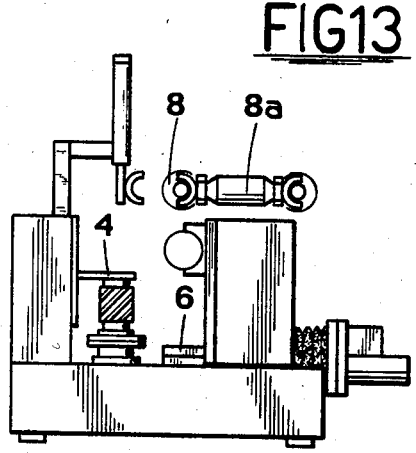
Figure 16:
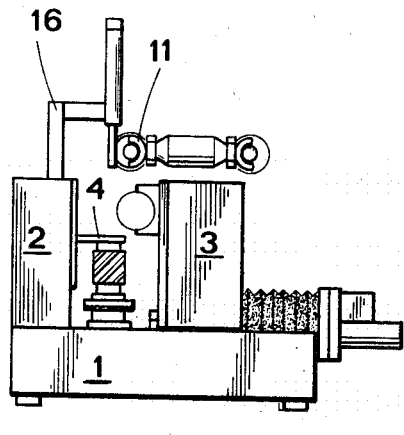
Figure 17:
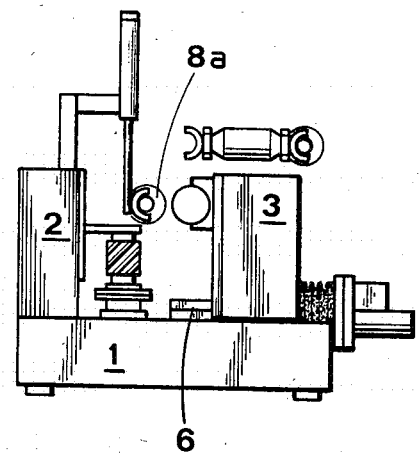
Figure 18:
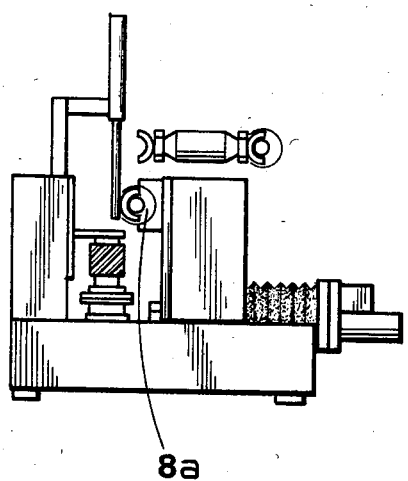
Figure 19:
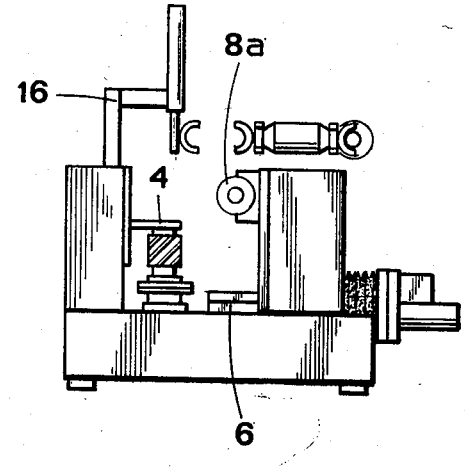

On reaching this position, the upright 3 is displaced forward and the hob 8 is carried into the grip of two arms 13 of the storage space 12. The upright 3 is displaced backwards anew and the storage space 12 undergoes an angular rotation such as to carry a new hob 8a into the region of the work plane of the grasping elements 11; the upright 3 is then returned forward carrying the hob 8a into the grip of the grasping elements 11 (FIGS. 14 to 16).

At this stage, in order to have, on completion of the operating cycle, the new hob 8a stably secured to the cutter head 5 (FIGS. 17 to 19), the same movements described previously for disengaging the hob 8 have to be effected in reverse.

The invertion as outlined above is liable to undergo numerous modifications and variations, all of which falling within the conceptual framework thereof. Furthermore, all parts may be substituted with other technically equivalent elements.

In practice, the materials used, as well as the shapes and sizes thereof, may be of any conventional type, depending on the requirements.

What is claimed is:

1. In equipment for automatically changing tools on hobbing machines of the type including a base plate, first and second uprights each of which having an upper surface and a lower surface and connected to said base plate, a work head supported on the first upright and a cutter head for cooperation with said work head supported on the second upright, base guides affixed to said base plate for cooperation with the second upright, the second upright being slidable in said base guides in the direction of the first upright, the cutter head being rotatable around a horizontal axis parallel to said base guides, and a hob horizontally supported at the extremities thereof in the cutter head for cooperation with said work head, the improvement comprising an independent frame fixable to one of the first and second uprights above the upper surface thereof, tool storage space supported by said independent frame and placed above the upright that supports the cutter head, grasping means supported by said independent frame and being rectilinearly movable in a vertical plane parallel to a frontal vertical plane of the cutter head and being displaceable from a virtually horizontal plane level with the cutter head to a plane level with the tool storage space and above the upper surface of the upright supporting the cutter head, guide means provided in the cutter head parallel to the axis of said hob so as to facilitate cooperation with said grasping means, and a support for at least one extremity of said hob being slidable inside the cutter head along the guide means thereof, said support being displaceable, without being withdrawn from the cutter head, by an amount sufficient to free the two extremities of said hob from the cutter head, said grasping means comprising a pair of grasping members movable together in an operating cycle of said equipment to disengage said hob from the cutter head and place the same in the tool storage space and in a reverse operating cycle carrying a new hob from the tool storage space to be secured to the cutter head.

2. The improved equipment according to claim 1, further comprising a pusher member supported by said independent frame above the upper surface of the upright supporting the cutter head, and operating in a direction perpendicular to the frontal vertical plane of the cutter head, said independent frame being fixed to the second upright that supports the cutter head and being subjected to the action of the push member, and said grasping means further comprising a pair of vertically disposed pistons linked at one extremity thereof to the push member and at the other extremity thereof to said pair of grasping members respectively so that said pair of grasping members are displaceable by the push member in a direction perpendicular to the frontal vertical plane of the cutter head.

3. The improved equipment according to claim 1, wherein said independent frame is fixed to the first upright that supports the work head, and extends toward the second upright that supports the cutter head.

4. The improved equipment according to claim 1, wherein the tool storage space comprises a head rotatable around a vertical axis, supported by said frame being independent of the second upright that supports the cutter head, and formed by a number of pairs of arms between which the extremities of said hob can be stably engaged, each of said arms being equipped with cradle-shaped grippers suitable to stably hold the extremities of said hob.

* * * * *